United States Patent
Strack et al.

(10) Patent No.: US 7,034,538 B2
(45) Date of Patent: Apr. 25, 2006

(54) METHOD FOR MEASURING EARTH FORMATION RESISTIVITY THROUGH AN ELECTRICALLY CONDUCTIVE WELLBORE CASING

(75) Inventors: Kurt M. Strack, Houston, TX (US); Horst Rueter, Dortmund (DE)

(73) Assignee: KJT Enterprises, Inc., Houston, TX (US)

( * ) Notice: Subject to any disclaimer, the term of this patent is extended or adjusted under 35 U.S.C. 154(b) by 0 days.

(21) Appl. No.: 11/133,112

(22) Filed: May 19, 2005

(65) Prior Publication Data
US 2005/0206375 A1    Sep. 22, 2005

Related U.S. Application Data

(62) Division of application No. 10/806,046, filed on Mar. 22, 2004.

(51) Int. Cl.
*G01V 3/18*    (2006.01)

(52) U.S. Cl. .................................. 324/347; 324/370

(58) Field of Classification Search ................ 324/358, 324/368, 347, 366, 351, 370, 371, 355; 181/102; 702/7; 367/25
See application file for complete search history.

(56) References Cited

U.S. PATENT DOCUMENTS

| 5,543,715 | A | * | 8/1996 | Singer et al. ............... 324/368 |
| 5,680,049 | A | * | 10/1997 | Gissler et al. ............. 324/368 |
| 6,246,240 | B1 | * | 6/2001 | Vail, III ..................... 324/368 |
| 6,603,314 | B1 | * | 8/2003 | Kostelnicek et al. ........ 324/368 |

\* cited by examiner

*Primary Examiner*—Bot Ledynh
*Assistant Examiner*—Reena Aurora
(74) *Attorney, Agent, or Firm*—Richard A. Fagin (57) ABSTRACT

An apparatus is disclosed for measuring formation resistivity through a conductive pipe in a wellbore. The apparatus includes a sonde adapted to be moved through the wellbore, and a plurality of voltage measurement electrodes are disposed on the sonde at spaced apart locations. At least one current source electrode is disposed on the sonde. All the electrodes are adapted to make electrical contact with the pipe. The apparatus includes a digital voltage measuring circuit controllably coupled to selected ones of the voltage measurement electrodes and digitally controlled current sources.

18 Claims, 6 Drawing Sheets

METHOD FOR MEASURING EARTH FORMATION RESISTIVITY THROUGH AN ELECTRICALLY CONDUCTIVE WELLBORE CASING

CROSS-REFERENCE TO RELATED APPLICATIONS

This is a division of U.S. patent application Ser. No. 10/806,046 filed on Mar. 22, 2004.

STATEMENT REGARDING FEDERALLY SPONSORED RESEARCH OR DEVELOPMENT

Not applicable.

BACKGROUND OF INVENTION

1. Field of the Invention

The invention relates generally to the field of Earth formation electrical resistivity measuring devices. More particularly, the invention relates to wellbore instruments for measuring formation resistivity from within an electrically conductive pipe or casing.

2. Background Art

Electrical resistivity measurements of Earth formations are known in the art for determining properties of the measured Earth formations. Properties of interest include the fluid content of the pore spaces of the Earth formations. Wellbore resistivity measuring devices known in the art typically require that the Earth formations be exposed by drilling a wellbore therethrough, and that such formations remain exposed to the wellbore so that the measurements may be made from within the exposed formations.

When wellbores are completely drilled through the Earth formations of interest, frequently a steel pipe or casing is inserted into and cemented in place within the wellbore to protect the Earth formations, to prevent hydraulic communication between subsurface Earth formations, and to provide mechanical integrity to the wellbore. Steel casing is highly electrically conductive, and as a result makes it difficult to use conventional (so called "open hole") techniques to determine the resistivity of the various Earth formations from within a steel pipe or casing.

It is known in the art to make measurements for determining the electrical resistivity of Earth formations from within conductive casing or pipe. A number of references disclose techniques for making such measurements. A list of references which disclose various apparatus and methods for determining resistivity of Earth formations from within conductive casings includes: USSR inventor certificate no. 56052, filed by Alpin, L. M. (1939), entitled, The method for logging in cased wells; USSR inventor certificate no. 56026, filed by Alpin, L. M. (1939), entitled, Process of the electrical measurement of well casing; U.S. Pat. No. 2,459,196, to Stewart, W. H. (1949), entitled, Electrical logging method and apparatus; U.S. Pat. No. 2,729,784 issued to Fearon, R. E. (1956), entitled, Method and apparatus for electric well logging; U.S. Pat. No. 2,891,215 issued to Fearon, R. E. (1959), entitled, Method and apparatus for electric well logging; French patent application no. 72.41218, filed by Desbrandes, R. and Mengez, P. (1972), entitled, Method & Apparatus for measuring the formation electrical resistivity In wells having metal casing; International Patent Application Publication no. WO 00/79307 A1, filed by Benimeli, D. (2002), entitled, A method and apparatus for determining of a formation surrounding a cased well; U.S. Pat. No. 4,796,186 issued to Kaufman, A. A. (1989), entitled, Conductivity determination in a formation having a cased well; U.S. Pat. No. 4,820,989, issued to Vail, III, W. (1989), entitled, Methods and apparatus for measurement of the resistivity of geological formation from within cased boreholes; U.S. Pat. No. 4,837,518 issued to Gard et al. (1989), entitled, Method and Apparatus for measuring the electrical resistivity of formation through metal drill pipe or casing; U.S. Pat. No. 4,882,542 issued to Vail, III, W. (1989), entitled, Methods and apparatus for measurement of electronic properties of geological formations through borehole casing; U.S. Pat. No. 5,043,668 issued to Vail, III, W. (1991), entitled, Methods and apparatus for measurement of electronic properties of geological formations through borehole casing; U.S. Pat. No. 5,075,626 issued to Vail, III, W. (1991), entitled, Electronic measurement apparatus movable in a cased borehole and compensation for casing resistance differences; U.S. Pat. No. 5,223,794 issued to Vail, III, W. (1993), entitled, Methods of apparatus measuring formation resistivity from within a cased well having one measurement and two compensation steps; U.S. Pat. No. 5,510,712 issued to Sezginer et al. (1996), entitled, Method and apparatus for measuring formation resistivity in cased holes; U.S. Pat. No. 5,543,715 issued to Singer et al. (1996), entitled, Method and apparatus for measuring formation resistivity through casing using single-conductor electrical logging cable; U.S. Pat. No. 5,563,514 issued to Moulin (1996), entitled, Method and apparatus for determining formation resistivity in a cased well using three electrodes arranged in a Wheatstone bridge. U.S. Pat. No. 5,654,639 issued to Locatelli et al. (1997), entitled, Induction measuring device in the presence of metal walls; U.S. Pat. No. 5,570,024 issued to Vail, III, W. (1996), entitled, Determining resistivity of a formation adjacent to a borehole having casing using multiple electrodes and resistances being defined between the electrodes; U.S. Pat. No. 5,608,323 issued to Koelman, J. M. V. A. (1997), entitled, Arrangement of the electrodes for an electrical logging system for determining the electrical resistivity of subsurface formation; U.S. Pat. No. 5,633,590 issued to Vail, III, W. (1997), entitled, Formation resistivity measurements from within a cased well used to quantitatively determine the amount of oil and gas present. U.S. Pat. No. 5,680,049 issued to Gissler et al. (1997), entitled, Apparatus for measuring formation resistivity through casing having a coaxial tubing inserted therein; U.S. Pat. No. 5,809,458 issued to Tamarchenko (1998), entitled, Method of simulating the response of a through-casing resistivity well logging instrument and its application to determining resistivity of earth formations; U.S. Pat. No. 6,025,721 issued to Vail, III, W. (2000), entitled, Determining resistivity of a formation adjacent to a borehole having casing by generating constant current flow in portion of casing and using at least two voltage measurement electrodes; U.S. Pat. No. 6,157,195 issued to Vail, III, W. (2000), entitled, Formation resistivity measurements from within a cased well used to quantitatively determine the amount of oil and gas present; U.S. Pat. No. 6,246,240 B1 issued to Vail, III, W. (2001), entitled, Determining resistivity of formation adjacent to a borehole having casing with an apparatus having all current conducting electrodes within the cased well; U.S. Pat. No. 6,603,314 issued to Kostelnicek et al. (2003), entitled, Simultaneous current injection for measurement of formation resistance through casing; and U.S. Pat. No. 6,667,621 issued to Benimelli, entitled, Method and apparatus for determining the resistivity of a formation surrounding a cased well.

United States Patent Application Publications which cite relevant art include no. 2001/0033164 A1, filed by Vinegar et al., entitled, Focused through-casing resistivity measurement; no. 2001/0038287 A1, filed by Amini, Bijan K., entitled, Logging tool for measurement of resistivity through casing using metallic transparencies and magnetic lensing; no. 2002/0105333 A1 filed by Amini, Bijan K., entitled, Measurements of electrical properties through non magnetically permeable metals using directed magnetic beams and magnetic lenses. and no. 2003/0042016 A1, filed by Vinegar et al., entitled, Wireless communication using well casing.

The foregoing techniques are summarized briefly below. U.S. Pat. No. 2,459,196 describes a method for measuring inside a cased wellbore, whereby electrical current is caused to flow along the conductive casing such that some of the current will "leak" into the surrounding Earth formations. The amount of current leakage is related to the electrical conductivity of the Earth formations. The '196 patent does not disclose any technique for correcting the measurements for electrical inhomogeneities in the casing.

U.S. Pat. No. 2,729,784 discloses a technique in which three potential electrodes are used to create two opposed pairs of electrodes in contact with a wellbore casing. Electrical current is caused to flow in two opposing "loops" through two pairs of current electrodes placed above and below the potential electrodes such that electrical inhomogeneities in the casing have their effect nulled. Voltage drop across the two electrode pairs is related to the leakage current into the Earth formations. The disclosure in U.S. Pat. No. 2,891,215 includes a current emitter electrode disposed between the measuring electrodes of the apparatus disclosed in the '784 patent to provide a technique for fully compensating the leakage current. U.S. Pat. No. 4,796,186 discloses the technique most frequently used to determine resistivity through conductive casing, and includes measuring leakage current into the Earth formations, and discloses measuring current flowing along the same portion of casing in which the leakage current is measured so as to compensate the measurements of leakage current for changes in resistance along the casing. Other references describe various extensions and improvements to the basic techniques of resistivity measurement through casing.

The methods known in the art for measuring resistivity through casing can be summarized as follows. An instrument is lowered into the wellbore having at least one electrode on the instrument (A) which is placed into contact with the casing at various depths in the casing. A casing current return electrode B is disposed at the top of and connected to the casing. A formation current return electrode B* is disposed at the Earth's surface at some distance from the wellbore. A record is made of the voltage drop and current flowing from electrode A in the wellbore at various depths, first to electrode B at the top of the casing and then to formation return electrode B*. Current flow and voltage drop through the casing (A-B) is used to correct measurements of voltage drop and current flow through the formation (A-B*) for effects of inhomogeneity in the casing.

If the Earth and the casing were both homogeneous, a record with respect to depth of the voltage drop along the casing, and the voltage drop through the casing and formation, would be substantially linear. As is well known in the art, casing includes inhomogeneities, even when new, resulting from construction tolerances, composition tolerances, and even "collars" (threaded couplings) used to connect segments of the casing to each other. Earth formations, of course, are not at all homogeneous, and more resistive formations are typically the object of subsurface investigation, because these Earth formations tend to be associated with presence of petroleum, while the more conductive formations tend to be associated with the presence of all connate water in the pore spaces. Therefore, it is the perturbations in the record of voltage drop with respect to depth that are of interest in determining resistivity of Earth formations outside casing using the techniques known in the art.

The conductivity of the Earth formations is related to the amount of current leaking out of the casing into the formations. The formation conductivity with respect to depth is generally related to the second derivative of the voltage drop along A-B with respect to depth, when current is flowing between A and B*. Typically, the second derivative of the voltage drop is measured using a minimum of three axially spaced apart electrodes placed in contact with the casing, coupled to cascaded differential amplifiers, ultimately coupled to a voltage measuring circuit. Improvements to the basic method that have proven useful include systems which create s small axial zone along the casing in which substantially no current flows along the casing itself to reduce the effects of casing inhomogeneity on the measurements of leakage current voltage drop.

In practice, instruments and methods known in the art require that the instrument make its measurements from a fixed position within the wellbore, which makes measuring formations of interest penetrated by a typical wellbore take an extensive amount of time. Further, the voltage drops being measured are small, and thus subject to noise limitations of the electronic systems used to make the measurements of voltage drop. Still further, systems known in the art for providing no-current zones, or known current flow values for measurements of voltage drop, are typically analog systems, and thus subject to the accuracy limitations of such analog systems.

Still further, it is known in the art to use low frequency alternating current (AC) to induce current flow along the casing and in the Earth formations. AC is used to avoid error resulting from electrical polarization of the casing and the electrodes when continuous direct current (DC) is used. Typically, the frequency of the AC must be limited to about 0.01 to 20 Hz to avoid error in the measurements caused by dielectric effects and the skin effect. It is also known in the art to use polarity-switched DC to make through casing resistivity measurements, which avoids the polarization problem, but may induce transient effect error in the measurements when the DC polarity is switched. Transient effects, and low frequency AC errors are not easily accounted for using systems known in the art.

SUMMARY OF THE INVENTION

One aspect of the invention is an apparatus for measuring formation resistivity through a conductive pipe in a wellbore. The apparatus includes a sonde adapted to be moved through the wellbore, and a plurality of potential measurement electrodes are disposed on the sonde at spaced apart locations. At least one current source electrode is disposed on the sonde. All the electrodes are adapted to make electrical contact with the pipe. The apparatus includes a digital voltage measuring circuit controllably coupled to selected ones of the potential measurement electrodes.

Another aspect of the invention is a method for measuring resistivity of Earth formations from within a conductive pipe inside a wellbore. A method according to this aspect of the invention includes conducting an electrical current between a first selected position in the wellbore through the conductive pipe to a second position along the pipe near the Earth's surface. A voltage drop measured between a third and fourth selected positions along the pipe between the first and second selected positions is digitally sampled. An electrical current is then conducted between the first selected position and a fifth selected position near the Earth's surface away from the pipe. The digitally sampling the voltage drop between the third and fourth positions is repeated. Resistivity of the Earth formation is determined from the digital samples of voltage drop.

Other aspects and advantages of the invention will be apparent from the following description and the appended claims.

DETAILED DESCRIPTION

Figure 1:
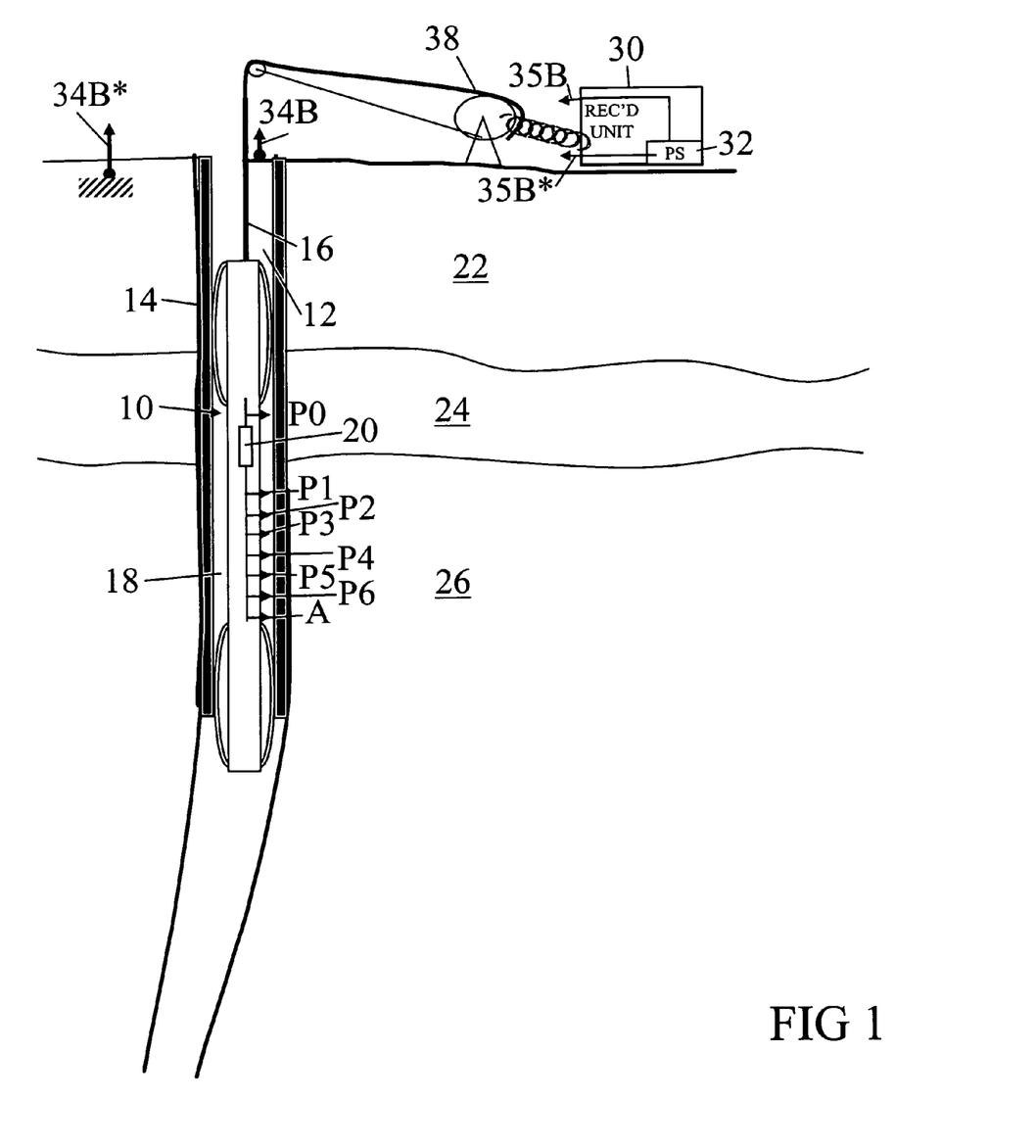
FIG. 1 shows an example resistivity measurement through casing apparatus according to the invention being used in a cased wellbore.

One embodiment of a well logging instrument used to measure resistivity of Earth formations from within a wellbore, when the wellbore has a conductive pipe or casing within is shown schematically in FIG. 1. The instrument 10 may include a sonde or similar mandrel-type housing 18. The housing 18 is preferably made from an electrically non-conductive material, or has such non-conductive material on its exterior surface. The housing 18 is adapted to be inserted into and withdrawn from the wellbore 14, by means of any well logging instrument conveyance known in the art. In the present example, the conveyance can be an armored electrical cable 16 extended and retracted by a winch 28. Other conveyances known in the art may be used, including coiled tubing, drill pipe, production tubing, etc. Accordingly, the conveyance is not intended to limit the scope of the invention.

The wellbore 14 is drilled through various Earth formations, shown schematically at 22, 24 and 26. After the wellbore 14 is drilled, a conductive pipe 12 or casing is inserted into the wellbore 14. If the pipe 12 is a casing, then the casing 12 is typically cemented in place within the wellbore 14, although cementing the pipe or casing is not necessary to operation of the instrument 10. While the embodiment shown in FIG. 1 is described in terms of a "casing" being inserted and cemented into a drilled wellbore, it should be understood that other types of electrically conductive pipe, such as drill pipe, coiled tubing, production tubing and the like may also be used with an instrument according to the invention. In one particular example, the pipe 12, rather than being casing, may be drill pipe that has become stuck in the wellbore 14, whereupon the instrument 10 is lowered into the stuck drill pipe on an armored electrical cable 16 to make measurements as will be further explained.

The armored electrical cable 16 includes one or more insulated electrical conductors (not shown separately) and is arranged to conduct electrical power to the instrument 10 disposed in the wellbore 14. Electrical power can be conducted from, and signals from the instrument 10 can be transmitted to, a recording unit 30 disposed at the Earth's surface using the electrical conductors on the cable 16. The recording unit 30 may also be used to record and/or interpret the signals communicated thereto from the instrument 10 in the wellbore 14. The recording unit 30 may include an electrical power supply 32 used to make measurements for determining resistivity of the various Earth formations 22, 24, 26. In the present description, any electrical power supply used to enable making the measurements corresponding to formation resistivity will be referred to as a "measuring current source." The power supply 32 may also be used merely to provide electrical power to various measurement and control circuits, shown generally at 20 in FIG. 1, in the instrument 10. The functions provided by the various circuits in the instrument will be further explained below with reference to FIG. 2.

Still referring to FIG. 1, a measuring current return electrode 34B* is provided at the Earth's surface at a selected distance from the wellbore 14. The measuring current return electrode 34B* is typically inserted into formations proximate the Earth's surface so as to provide an electrically conductive path to the Earth formations 22, 24, 26 penetrated by the wellbore 14. The measuring current return electrode 34B* provides, in particular, a current path through the Earth formations 22, 24 26 for electrical measuring current to flow from a source electrode A on the instrument 10. The current return electrode 34B* may be connected, as shown in FIG. 1, either to circuits 35B* in the recording unit 30, or alternatively may be connected to one of the electrical conductors (not shown separately) in the cable 16. A casing current return electrode 34B, shown connected to the top of the pipe or casing 12, provides a return path for electrical measuring current caused to flow from the current source electrode A on the instrument 10, to the top of the casing 12. The casing current return electrode 34B may be coupled to circuits 35B in the recording unit 30, or may be coupled to one of the conductors (not shown) in the cable 12 for return to the circuits 20 in the instrument 10.

The instrument 10 includes a plurality of electrodes, shown at A, and P0 through P6 disposed on the sonde mandrel 18 at axially spaced apart locations. The electrodes A, P0–P6 are electrically isolated from each other by the non-conductive material disposed on the exterior of, or forming, the sonde mandrel 18. Each of the electrodes A, P0–P6 is mechanically and electrically adapted to make good electrical contact with the casing 12. Various types of casing-contact electrodes are known in the art and include brushes, hydraulically actuated "spikes", spiked wheels and similar devices. The electrodes A, P0–P6 are each coupled to a selected portion of the electronic circuits 20 in the instrument 10.

During operation of the instrument 10 when conveyed by armored cable, the cable 16 is extended by the winch 28 so that the instrument 10 is positioned at a selected depth in the wellbore 14. Electrical power is passed through the casing 12 and through the Earth formations 22, 24, 26 by selective connection between the source electrode A at one end of the current path, and either the casing return 34B or formation return 34B*, respectively, at the other end of the current path. Measurements are made of the voltage extant between a reference potential electrode, shown as electrode P0 in FIG. 1, and one or more potential measurement electrodes, P1–P6 in FIG. 1. Depending on the type of electrodes used, for example, brushes or spiked contact wheels, it may be possible, in some embodiments, for the instrument 10 to be moved slowly along the wellbore 14 as the measurements are being made. Other types of electrode, such as hydraulically actuated spikes, may require that the instrument 10 remain essentially stationary during any one measurement sequence. As the voltage measurements are made, whether the instrument 10 is stationary or moving, the instrument 10 is gradually withdrawn from the wellbore 14, until a selected portion of the wellbore 14, including formations of interest, 22, 24, 26, have voltage measurements made corresponding to them, both using the casing current return 34B and the formation current return 34B*.

Figure 2:
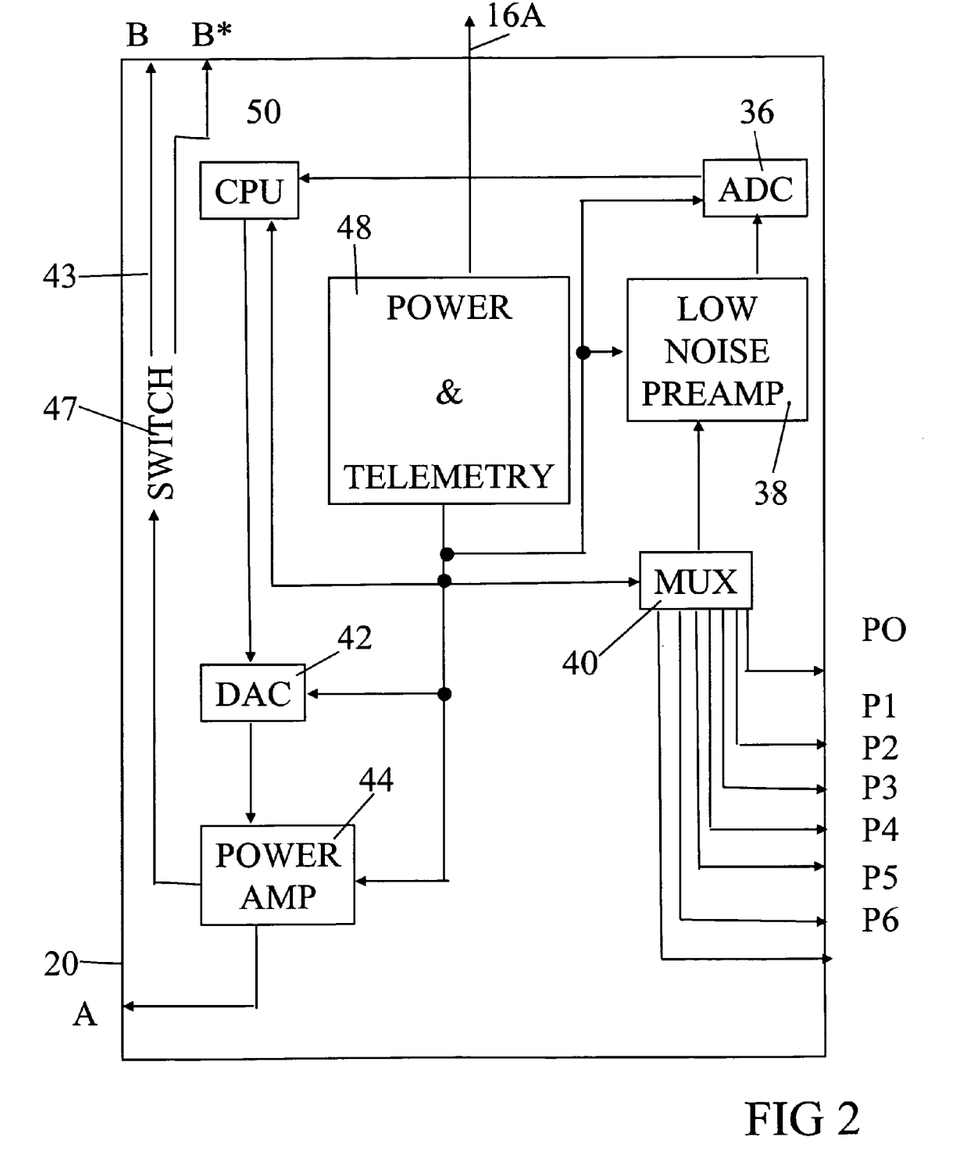
FIG. 2 shows a circuit systems of the example apparatus of FIG. 1 in more detail.

One embodiment of the electronic circuits 20 is shown in greater detail in FIG. 2. The present embodiment of the circuits 20 may include a central processing unit (CPU) 50, which may be a preprogrammed microcomputer, or a programmable microcomputer. In the present embodiment, the CPU 50 is adapted to detect control commands from within a formatted telemetry signal sent by the recording unit (30 in FIG. 1) to a telemetry transceiver and power supply unit 48. The telemetry transceiver 48 also performs both formatting of data signals communicated by the CPU 50 for transmission along a cable conductor 16A to the recording unit (30 in FIG. 1) and reception and conditioning of electrical power sent along the conductor 16A for use by the various components of the circuits 20. The CPU 50 may also be reprogrammed by the command signals when such are detected by the telemetry transceiver 48 and conducted to the CPU 50. Reprogramming may include, for example, changing the waveform of the measure current used to make the previously explained voltage drop measurements. Reprogramming may also include changing the magnitude of the measure current, and may include changing a sample rate of voltage drop measurements, among other examples. Still other forms of reprogramming will be explained with reference to FIGS. 4 through 6.

While the embodiment shown in FIG. 2 includes an electrical telemetry transceiver 48, it should be clearly understood that optical telemetry may be used in some embodiments, and in such embodiments the telemetry transceiver 48 would include suitable photoelectric sensors and/or transmitting devices known in the art. In such embodiments, the cable 16 should include at least one optical fiber for conducting such telemetry signals. One embodiment of an armored electrical cable including optical fibers therein for signal telemetry is disclosed in U.S. Pat. No. 5,495,547 issued to Rafie et al. Other embodiments may use optical fibers to transmit electrical operating power to the instrument 10 from the recording unit 30. The cable disclosed in the Rafie et al. '547 patent or a similar fiber optic cable may be used in such other embodiments to transmit power to the instrument over optical fibers.

The CPU 50 may include in its initial programming (or may be so programmed by reprogramming telemetry signals) a digital representation of various current waveforms used to energize the Earth formations (22, 24 26 in FIG. 1) and the casing (12 in FIG. 1) for determining the resistivity of the Earth formations (22, 24, 26 in FIG. 1). The digital representation includes information about the frequency content, the shape of the waveform and the amplitude of the current to be conducted through the formations and casing. The digital representation can be conducted to a digital to analog converter (DAC) 42, which generates an analog signal from the digital representation. The analog signal output of the DAC 42 is then conducted to the input of a power amplifier 44. The power amplifier 44 output is connected between the current source electrode A and a switch 47. The switch 47 is under control of the CPU 50. The switch 47 alternates connection of the other output terminal of the power amplifier 44 between the casing return electrode B and the formation return electrode B*, or other current electrodes in other electrode arrangements. Alternatively, the other output terminal of the power amplifier 44 may be connected to one of more cable conductors (either 16A or other electrical conductor), and the switching between casing return and formation return may be performed within the recording unit (30 in FIG. 1). Yet another alternative omits the DAC 42 and the power amplifier 44 from the circuits 20, and provides measuring current and switching features using the power supply (32 in FIG. 1) in the recording unit (30 in FIG. 1) and appropriate conductors (not shown) in the cable (16 in FIG. 1). In the latter example embodiment, measuring current may be conducted to the source electrode A using one or more cable conductors, such as 16A in FIG. 2.

In the present embodiment, voltage measurements can be made between the potential reference electrode P0 and a selected one of the potential measuring electrodes P1–P6. The one of the voltage measuring electrodes from which measurements are made at any moment in time can be controlled by a multiplexer (MUX) 40, which itself may be controlled by the CPU 50. The output of the MUX 40 is connected to the input of a low noise preamplifier or amplifier 38. The output of the preamplifier 38 is coupled to an analog to digital converter (ADC) 36. The ADC 36 may be a sigma delta converter, successive approximation register, or any other analog to digital conversion device known in the art, that preferably can provide at least 24 bit resolution of the input signal. Digital signals output from the ADC 36 represent the measured potential between the reference electrode P0 and the MUX-selected one of the voltage measuring electrodes P1–P6. One possible advantage of using the MUX 40 and single preamplifier 38 as shown in FIG. 2 is that the analog portion of the voltage measuring circuitry will be substantially the same irrespective of which voltage measuring electrode P1–P6 is being interrogated to determine potential drop with respect to electrode P0. As a result, measurement error caused by differences in preamplifier 38 response may be reduced or eliminated. Preferably, the ADC 36 is a twenty-four bit device capable of accurately resolving measurements representing voltage differences as small as one nanovolt $1\times10^{-9}$ volts). Alternatively, each measurement electrode P1–P6 could be coupled to one input terminal of a separate preamplifier (not shown in the Figures) for each electrode P1–P6, thus eliminating the MUX 40 from the analog input circuitry.

Digital words representing the voltage measurements can be conducted from the ADC 36 to the CPU 50 for inclusion in the telemetry to the recording unit (30 in FIG. 1). Alternatively, the CPU 50 may include its own memory or other storage device (not shown separately) for storing the digital words until the instrument (10 in FIG. 1) is removed from the wellbore (14 in FIG. 1). In some embodiments, a sample rate of the ADC 36 is in the range of several kilohertz (kHz) both to provide both a very large number of voltage signal samples, preferably at least one thousand, per cycle of current waveform, and to be able to sample transient effects when switched DC is used as a current source to make resistivity measurements. In such embodiments, a switching frequency of the switched DC can be in a range of about 0.01 to 20 Hz, thus enabling the ADC 36 to make preferably at least one thousand, and as many as several thousand, voltage measurement samples within each cycle of the switched DC.

In the present embodiment, the ADC 36 operates substantially continuously, to provide a relatively large number of digital signal samples for each cycle of the current source waveform. In the present embodiment, such substantially continuous operation of the ADC 36 may provide the advantage of precise, prompt determination of any DC bias in the voltage measurements. Such DC bias must be accounted for in order to precisely determine formation resistivity from the voltage measurements. In systems known in the art which do not operate voltage measuring devices substantially continuously, it is necessary to determine DC bias by other means. See, for example, U.S. Pat. No. 5,467,018 issued to Rueter et al.

Figure 3A:
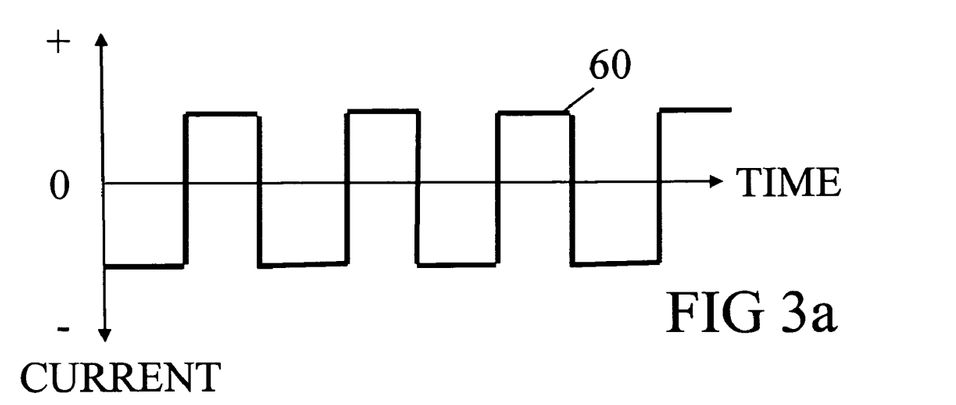
FIGS. 3A through 3C show different examples of current waveform for making through casing resistivity measurements according to the invention.
Figure 3B:
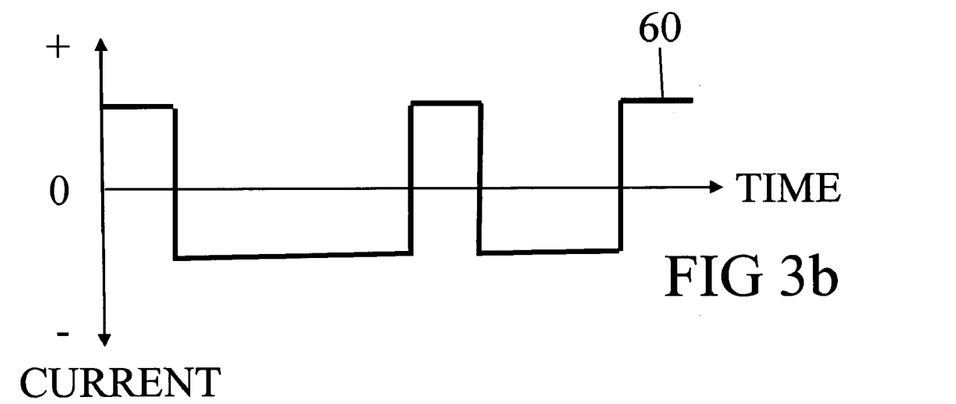
Figure 3C:
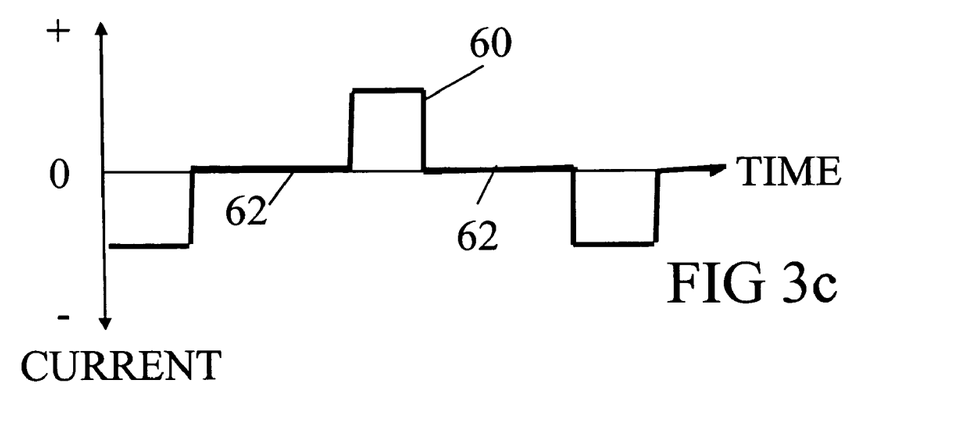

The measuring current waveform, as previously explained, may be generated by conducting waveform numerical values from the CPU 50, or other storage device (not shown) to the DAC 42. Referring now to FIGS. 3A through 3C, several types of current waveforms particularly suited to making through-casing (or through electrically conductive pipe) resistivity measurements will be explained. FIG. 3A is a graph of current output of the power amplifier (44 in FIG. 2) with respect to time. The current waveform 60 in FIG. 3A is a low frequency (0.01 to 20 Hz) square wave, which may be generated using switched DC, or by conducting appropriate numbers representing such a waveform to the DAC (42 in FIG. 2). The waveform 60 in FIG. 3A is periodic, meaning that the waveform is substantially constant frequency within a selected time range, and has 100 percent "duty cycle", meaning that current is flowing substantially at all times.

Another possible current waveform is shown at 60 in FIG. 3B. The current waveform in FIG. 3B is a random or pseudo random frequency square wave, also having 100 percent duty cycle. As with the previous embodiment (FIG. 3A), the embodiment of current waveform shown in FIG. 3B may be generated by conducting appropriate digital words from the CPU (50 in FIG. 2) to the DAC (42 in FIG. 2). Random switching will be advantageous to avoid aliasing or other adverse effects related to periodic data sampling.

Another possible waveform is shown at 60 in FIG. 3C. The current waveform 60 in FIG. 3C is a periodic square wave having less than 100 percent duty cycle. Less than 100 percent duty cycle can be inferred from time intervals, shown at 62, in which no current is flowing. As with the previous embodiment (FIG. 3A), the embodiment of current waveform shown in FIG. 3C may be generated by conducting appropriate digital words from the CPU (50 in FIG. 2) to the DAC (42 in FIG. 2). Using less than 100 percent duty cycle may be advantageous to save electrical power where measured voltage drops are sufficiently large to make possible a reduction in the number of voltage samples measured. Using less than 100 percent duty cycle may also enable determination of some transient effects, by measuring voltage drops across the various electrodes (P0 b between P1–P6 in FIG. 1) during a short time interval after the current is switched off. Such induced potential (IP) effects may be related to fluid composition within the pore spaces of the Earth formations (22, 24, 26 in FIG. 1). Using less than 100 percent duty cycle may also enable better determination of any DC bias, by using the times with no current flow 62 as measurement references.

The foregoing examples shown in FIGS. 3A, 3B and 3C are not the only current waveforms that may be generated using the CPU/DAC combination shown in FIG. 2. As will be readily appreciated by those skilled in the art, substantially any frequency and waveform type may be generated, including for example sinusoidal waveforms, by conducting appropriate digital words to the DAC (42 in FIG. 2). In some embodiments, the digital words may be stored in the CPU (50 in FIG. 2). In other embodiments, the digital words themselves, or a command which activates selected waveform digital words, may be transmitted from the recording unit (30 in FIG. 1) to the instrument (10 in FIG. 1) over the cable (16 in FIG. 1). In other embodiments, the waveform may be a pseudo random binary sequence (PRBS).

Referring once again to FIG. 2, some embodiments may include one or more of the following features, either programmed into the CPU 50, or programmed into a surface computer in the recording unit (30 in FIG. 1). Some embodiments may include automatic editing of voltage measurements made across the one or more electrode pairs, P0 between any one of P1–P6. For example, if a particular digital voltage sample represents a number outside of a selected range, the sample may be discarded, and an interpolated value may be written to storage in the CPU 50, or transmitted to the recording unit (30 in FIG. 1) for the outlying sample value. Alternatively, if voltage measurements do not increase monotonically as the spacing between P0 and the various measurement electrodes P1–P6 is increased, the anomalous voltage samples may be discarded; interpolated or otherwise not written directly to storage. Other embodiments may include stacking of voltage measurement words corresponding to the same electrode pair (P0 between any of P1–P6) at substantially the same depth in the wellbore to improve the signal to noise ratio of the measurements significantly.

Referring once again to FIG. 1, still other embodiments may include permanent installation of an array of electrodes, such as shown in FIG. 1 at A and P0 through P6 inside the casing 16. A cable or similar device may be used to make electrical connection to the Earth's surface from inside the wellbore 14 at a selected depth proximate a petroleum bearing reservoir, for example, formation 24 in FIG. 1. Measurements may be made at selected times during the life of the wellbore 14 to determine movement of a water contact (not shown in FIG. 1) with respect to time. In such permanent emplacements of electrodes A, P0–P6, the circuits 20 may be disposed at the Earth's surface, or may themselves be disposed in the wellbore 14, just as for the cable conveyed instrument described earlier herein.

Operating the instrument may be performed in a number of different ways, of which several will be explained herein. In a regular measurement mode, the instrument 10 may be moved to a selected depth in the wellbore 14 at which measurements are to be made. First, the circuits 20 are operated, either by internal programming of the CPU (50 in FIG. 2) or by command transmitted from the recording unit (30 in FIG. 1) first to enable measuring voltage drop caused by current flow entirely along the casing 12. To make casing voltage drop measurements, the power amplifier (44 in FIG. 2) is connected between the current source electrode A on the instrument 10 and casing current return electrode 34B coupled to the top of the casing (12 in FIG. 1) at the Earth's surface. Voltage measurements between P0 and any one or more of P1 through P6 are then made. The output of the power amplifier (44 in FIG. 2) is then switched to return the measuring current at measuring current return electrode 34B\* at the Earth's surface. Another set of voltage measurements between P0 and the same ones of P1 through P6 are made. The instrument 10 may then be moved a selected axial distance along the wellbore 14, and the measuring process can be repeated. Values of voltage difference made between P0 and any one or more of P1 through P6 can be converted mathematically into a second derivative, with respect to depth in the wellbore 14, of the measured voltage drop. The values of such second derivative are related to the depth-based current leakage into the Earth formations 22, 24, 26, and are thus related to the electrical conductivity of each of the formations 22, 24, 26. Advantageously, an instrument configured substantially as shown in FIGS. 1 and 2 does not require measurement of voltage drop across cascaded differential amplifiers (all of which would be analog) to determine the second derivative of voltage drop with respect to depth.

Figure 4:
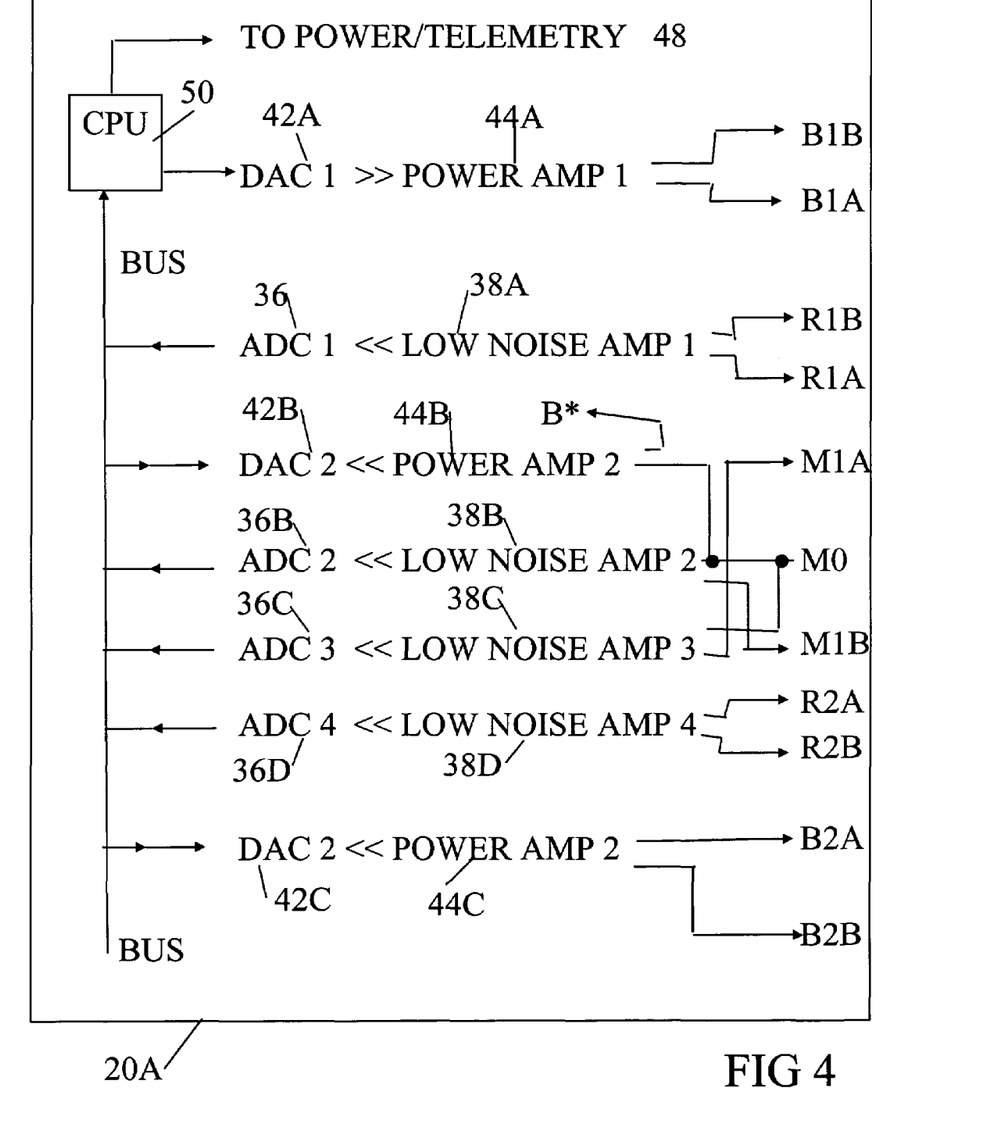
FIG. 4 shows an example instrument for measuring resistivity through a conductive pipe which includes current focusing systems.

Performance of an instrument according to the invention may be improved by providing focusing current systems to axially constrain the flow of measuring current through the various Earth formations. An example instrument which includes focusing current systems is shown schematically in FIG. 4. The principle of measurement of the example instrument shown in FIG. 4 is described in U.S. Pat. No. 2,729,784 issued to Fearon, incorporated herein by reference. The instrument in FIG. 4 includes an array of electrodes disposed at selected locations along the instrument mandrel or housing (18 in FIG. 1). The electrodes may be similar in mechanical and electrical configuration to the electrodes described above with reference to FIG. 1. The electrodes are adapted to make electrical contact with the pipe or casing (12 in FIG. 1) in the wellbore (14 in FIG. 1).

The electrodes in the embodiment of FIG. 4 include two pairs of focusing current electrodes, shown at B1A, B1B and B2A, B2B, approximately equally spaced on either axial side of a central measuring current source electrode M0. Reference potential measuring electrodes R1A, R1B and R2A, R2B are disposed, respectively, between each focusing current electrode pair B1A, B1B; B2A, B2B, and the measuring current source electrode M0. Each focusing current electrode pair B1A, B1B and B2A, B2B is connected across the output of a corresponding focusing current power amplifier 44A, 44C, respectively. In the present embodiment, the focusing current is generated by driving each power amplifier 44A, 44C using the output of a corresponding DAC 42A, 42C. Each DAC 42A, 42C can be connected to a bus or other similar data connection to the CPU 50. As in the embodiment explained above with reference to FIG. 2, the embodiment shown in FIG. 4 may include digital words stored or interpreted by the CPU 50 which represent the focusing current waveform to be generated by each power amplifier 44A, 44C and conducted to the casing (12 in FIG. 1). Aspects of the waveform which may be controlled include amplitude, phase, frequency and duty cycle, among other aspects.

Each pair of reference potential measuring electrodes R1A, R1B and R2A, R2B is coupled across the input terminals of a respective low noise preamplifier 38A, 38B, or low noise amplifier, similar to the preamplifier described with reference to FIG. 2. Each low noise preamplifier 38A, 38B has its output coupled to an ADC 42A, 42B. The ADC 42A, 42B outputs are coupled to the bus or otherwise to the CPU 50. In the present embodiments, the ADCs 42A, 42B are preferably 24 bit resolution devices, similar to the ADC described with reference to FIG. 2. In the present embodiment, potential difference measurements are made across each pair of reference potential electrodes R1A, R1B and R2A, R2B, respectively. The CPU 50 receives digital words representing the measured potential across each reference electrode pair R1A, R1B and R2A, R2B, respectively. The magnitude of the focusing current output by each power amplifier 44A, 44C can be controlled by the CPU 50 such that the measured potential across each pair of reference potential electrodes R1A, R1B and R2A, R2B, respectively, is substantially equal to zero. The CPU 50 may cause such adjustments to be made by, for example, changing the amplitude or changing the duty cycle of the power amplifier 44A, 44B outputs, or both. Changes to amplitude and/or duty cycle may be made to either or both power amplifier 44A, 44B. Other methods for changing or adjusting the power output of each focusing current power amplifier 44A, 44C will occur to those skilled in the art. The purpose of making such focusing current magnitude adjustments so as to maintain substantially zero potential across the reference electrodes R1A, R1B and R2A, R2B, respectively, is to assure that there is a region within the casing (12 in FIG. 1) where substantially no net current flows along the casing in either an upward or downward direction.

The embodiment of FIG. 4 can include a digitally controlled measuring current source. The source consists of, in the present embodiment, a measuring current DAC 42B coupled to the bus or otherwise to the CPU 50. Measuring current is generated by conducting waveform words to the DAC 42B, which converts the words into a driver signal for a measuring current power amplifier 44B coupled at its input to the DAC 42B output. Measuring current output from the measuring current power amplifier 44B is coupled to the measuring current source electrode M0, and maybe returned at the Earth's surface, at return electrode 34B*, or alternatively at casing current return 34B. Measuring potential electrodes M1A, M1B are disposed on either side of the measuring current source electrode M0. Each measuring potential electrode M1A, M1B, and the source electrode M0 is coupled across the input of a respective measuring potential low noise amplifier 38B, 38C. The output of each measuring potential low noise amplifier 38B, 38C is coupled to a respective ADC 36B, 36C, wherein digital words representing the value of measured potential across each respective pair of measure potential electrodes M1A, M0 and M1B, M0 are conducted to the CPU 50 for processing. The measuring potential ADC 44B is also preferably a 24 bit resolution device. Resistivity of the Earth formations outside the casing is related to the potential across the measuring potential electrodes and the magnitude of the measuring current. Waveform, frequency and duty cycle of the measuring current may be controlled in a substantially similar manner as explained with reference to the embodiment of FIG. 2.

Possible advantages of a system as shown in FIG. 4 include more accurate control over focusing current properties than was previously possible, making measurements of potential across the measuring electrodes M1A, M1B more accurate.

Figure 5:
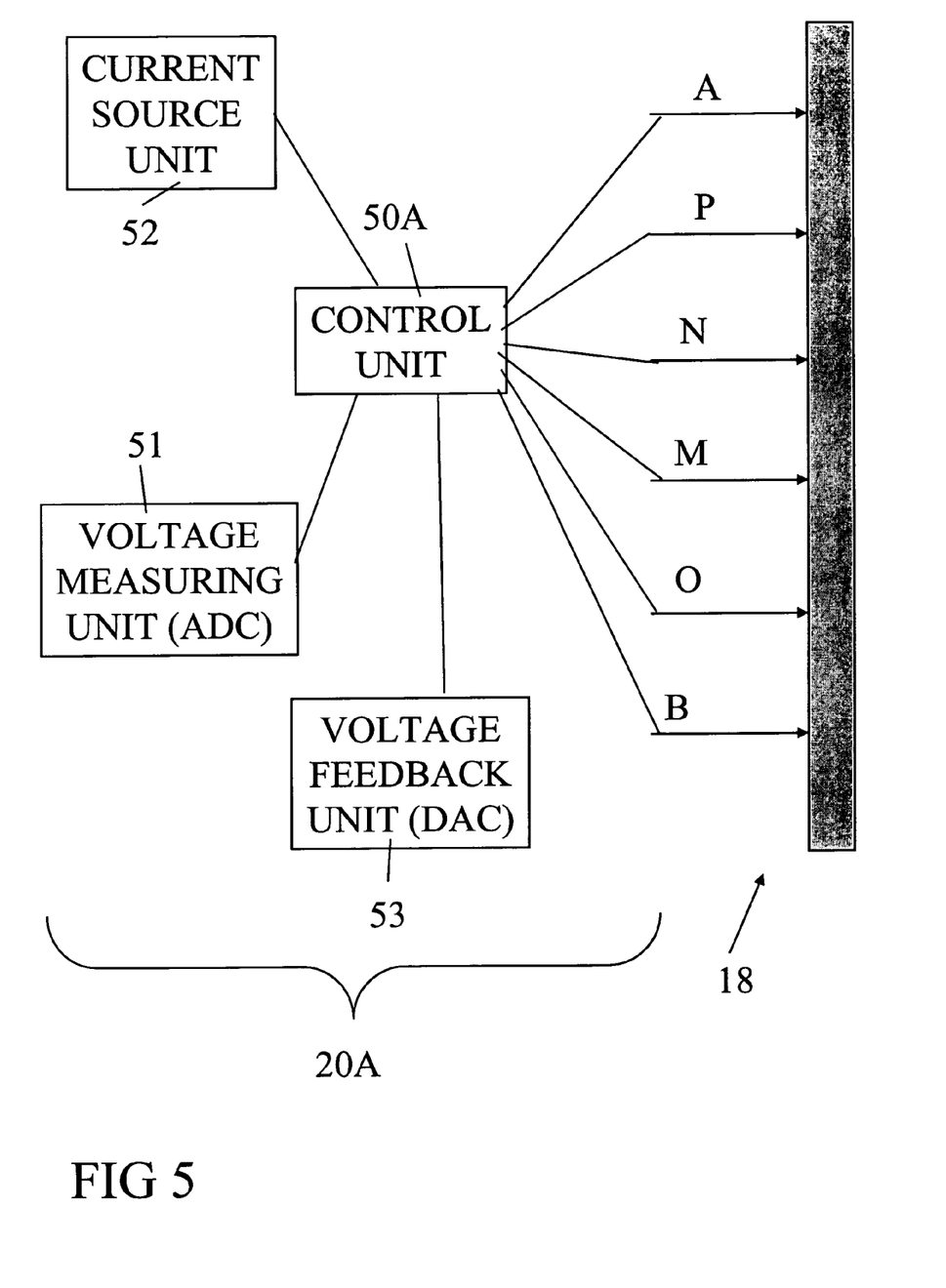
FIG. 5 shows an alternative embodiment of an apparatus including a selectable array of electrodes on a sonde mandrel.

Another embodiment of an instrument according to the invention is shown schematically in FIG. 5. The instrument includes an array of electrodes disposed on the instrument housing 18 at axially spaced apart locations. The electrodes are designated A, B, P, O, N and M. The electrodes are coupled through a switching system, designated "control unit" 50A (which may be associated with for form part of a controller similar in design to CPU 50 from FIG. 2). The control unit 50A selects which electrodes are coupled to which one or selected circuits. The circuits include a current source 52. The current source 52 may be a digital synthesizer, and may include a DAC and power amplifier (not shown separately). The circuits may include a voltage (or potential) measuring circuit 51, which may include a low noise preamplifier and ADC (not shown separately) as explained with reference to FIG. 2. The circuits may also include a voltage feedback unit 53, which may be similar in configuration to the focusing current source explained with reference to FIG. 4.

To perform various types of measurements, the instrument shown in FIG. 5 can select the measuring and focusing current sources to be applied to, and voltage measurements to be made across, selected ones of the electrodes and selected electrode pairs. Examples of various modes of measurement, and the electrodes used to make measurements in each of the modes, are explained in the following table:

| Measurement Mode | Current source and return electrodes | Potential measured across electrodes |
|---|---|---|
| Downhole, completely contained | A, B | M and N; O and P |
| Deep penetrating resistivity | B, current return is at Earth's surface away from top of casing (return 34B*) | M and N; O and P |
| Fast measurement | M and N | A and B; O and P |
| Mixed | Mix sources | Mix pairs |

In the above table, the "Current source and return electrodes" column represents the electrodes coupled to the measuring current source 52. Potential measurement is made across electrode pairs as indicated in the "Potential measured across electrodes" column.

Figure 6:
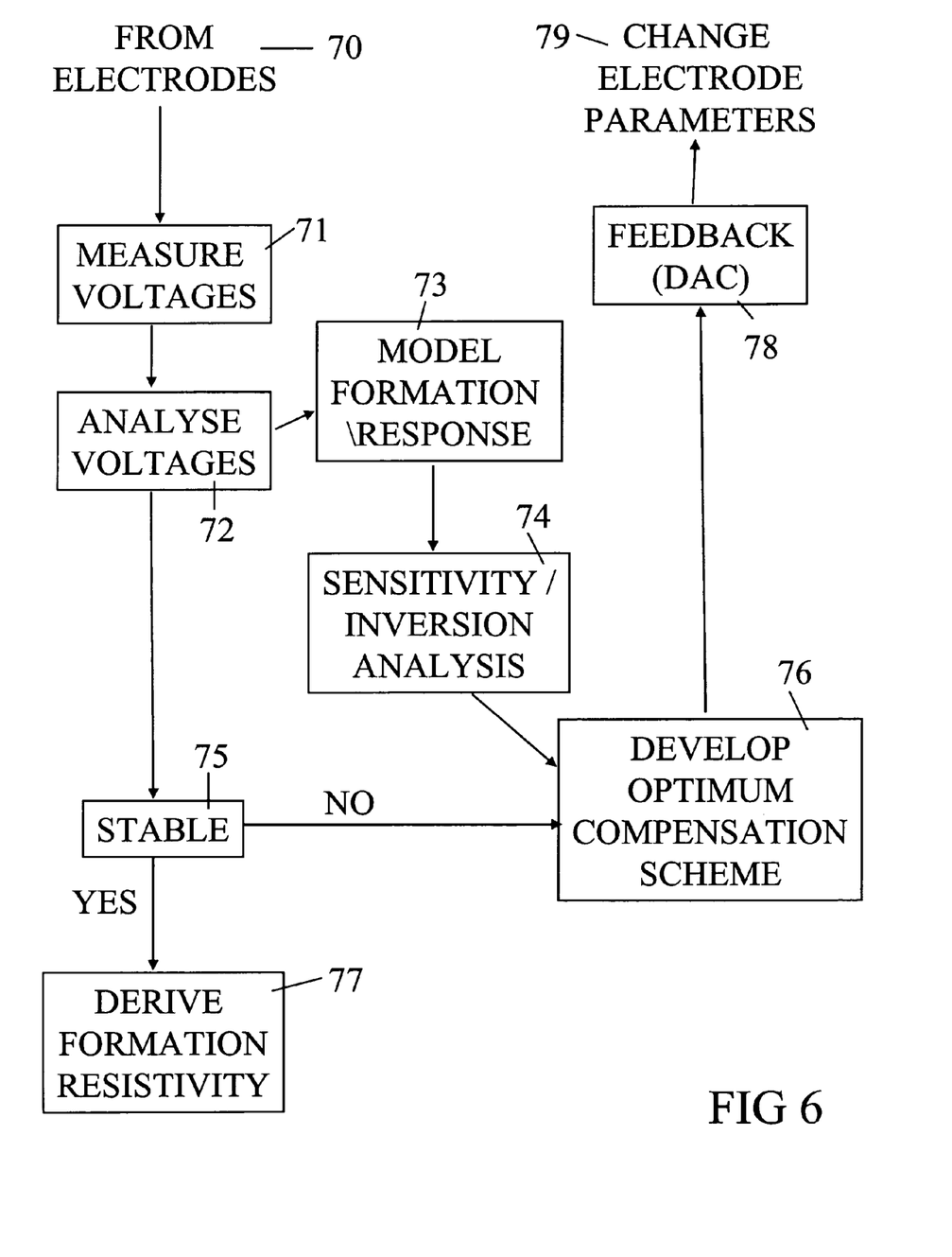
FIG. 6 shows a flow chart of operation of an instrument such as shown in FIG. 4 adapted to automatically optimize control of electrode usage according to a model based instrument response.

Various configurations of an instrument according to the invention which include a suitably programmed CPU (50 in FIG. 2) may provide substantially real-time automatic control of selection of the various electrodes for the purposes as explained above with reference to FIG. 4, namely axial spacings of the voltage measuring electrodes, and the spacing of and amount of focusing current supplied to various focusing electrodes. A generalized flow chart showing one embodiment of a system programmed to perform the foregoing functions is shown in FIG. 6. At 70, initially configured electrodes, current sources and voltage measuring circuits emit measuring current, focusing current and make voltage measurements, respectively. Initial configuration may be set by the system operator, or may be preprogrammed. Preprogrammed or operator-selected initial configuration may be based on parameters such as expected thickness of the various Earth formations and expected resistivities of the various Earth formations, among other parameters. At 71, voltages are measured, at least for one pair of voltage measuring electrodes. In configurations which include reference potential electrodes, for example as explained with reference to FIG. 4, such reference potentials may also be measured. At 72 the measured voltages are analyzed. Analysis may include determining a magnitude of voltage drop along the casing to determine casing resistance, and may include determining voltage drop of leakage current into the formations. Analysis may include determination of polarization direction for reference potential measurements which are not substantially equal to zero. At 75, the analysis is used to determine if the response obtained represents a stable set of formation resistivity calculations. If the response is stable, at 77, the voltage measurements are used to determine formation resistivity, typically, as previously explained, by determining a second derivative, with respect to depth, of the magnitude of leakage current corrected for casing resistance variation in the vicinity of where the measurements are made.

At 73, the voltage measurements may be used to develop a model of the resistivity distribution around the outside of the wellbore (14 in FIG. 1) proximate the instrument (10 in FIG. 1). Methods for determining a model of the Earth formations are disclosed, for example, in U.S. Pat. No. 5,809,458 issued to Tamarchenko (1998), entitled, Method of simulating the response of a through-casing resistivity well logging instrument and its application to determining resistivity of earth formations. At 74, the model is subjected to a sensitivity analysis. The model, using appropriate sensitivity analysis, may be used, at 76, to determine an optimum arrangement of focusing current electrodes. If the determined optimum focusing current electrode arrangement is different from the initial or current configuration, the configuration is changed, at 79, and focusing current parameters are changed at 78 to provide the model with the optimum sensitivity response.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for measuring resistivity of Earth formations from within a conductive pipe inside a wellbore, comprising:
   conducting an electrical current between a measure current source electrode at a first selected position in the wellbore through the conductive pipe to a measure current return electrode at a second position along the pipe near the Earth's surface;
   digitally sampling a voltage drop measured between at least two voltage measuring electrodes at respective third and fourth selected positions along the pipe between the first and second selected positions;
   conducting an electrical current between the measure current source electrode at the first selected position and a measure current return electrode at a fifth selected position near the Earth's surface away from the pipe;
   repeating the digitally sampling the voltage drop between the third and fourth position; and
   determining resistivity of the Earth formation from the digital samples of voltage drop.

2. The method of claim 1 further comprising moving the first, the fourth and the third positions, and repeating the conducting current between the first and second positions, the digitally sampling, the conducting current between the first and fifth positions and the repeated digitally sampling.

3. The method of claim 1 further comprising conducting a focusing current from a focusing current electrode at a selected position along the pipe, the focusing current configured to constrain flow of current from the first position to the fifth position along substantially laterally outward paths from the wellbore in the lateral vicinity of the wellbore.

4. The method of claim 3 further comprising controlling a magnitude of the focusing current so that a voltage drop measured axially along the wellbore between selected positions remains substantially zero.

5. The method of claim 1 further comprising controlling a duty cycle of the current flowing from the wellbore to the respective electrodes at the second and to the fifth positions near the Earth's surface to correspond to an apparent conductivity of Earth formations.

6. The method of claim 1 wherein the digitally sampling is performed at a rate of at least about one thousand times a frequency of the current flowing from the first selected position so as to enable determination of transient effects.

7. The method of claim 1 wherein the conducting an electrical current between the first selected electrode position and the second electrode position, and the conducting electrical current between the first position and the fifth electrode position comprises switching polarity of a direct current.

8. The method of claim 7 wherein a frequency of the switching is within a range of about 0.2 to 20 Hertz.

9. The method of claim 7 wherein the switching is performed according to a pseudo random binary sequence.

10. The method of claim 1 wherein the conducting an electrical current between the first selected electrode position and the second electrode position, and the conducting electrical current between the first position and the fifth electrode position comprises generating alternating current.

11. The method of claim 10 wherein a frequency of the alternating current is within a range of about 0.2 to 20 Hertz.

12. The method of claim 1 further comprising selecting an axial distance between the fourth and third electrode positions in response to an expected resistivity of the Earth formations.

13. The method of claim 12 wherein the selecting an axial distance comprises generating an initial model of the Earth formations, estimating a resistivity of the Earth formations from the digitally sampled voltage measurements and selecting the axial distance based on differences between the initial model and the estimated resistivities.

14. The method of claim 1 further comprising selecting an axial distance between the first electrode position and at least one of the fourth and third electrode positions in response to an expected resistivity of the Earth formations.

15. The method of claim 14 wherein the selecting an axial distance comprises generating an initial model of the Earth formations, estimating a resistivity of the Earth formations from the digitally sampled voltage measurements and selecting the axial distance based on differences between the initial model and the estimated resistivities.

16. The method of claim 14 further comprising passing a focusing current through the pipe at selected axial positions, the axial positions for passing the focusing current selected in response to at least one of the initial model and the differences between the initial model and the estimated resistivities, the focusing current having a flow path selected to constrain the electrical current flowing from the first position substantially to a predetermined geometry.

17. The method of claim 16 further comprising adjusting a magnitude of the focusing current in response to at least one of the initial model and the differences between the initial model and the estimated resistivities.

18. The method of claim 16 further comprising measuring a voltage drop across selected monitoring positions along the pipe, and adjusting a magnitude of the focusing current so that the voltage drop across the selected monitoring positions is substantially zero.

* * * * *